United States Patent [19]

Carlson

[11] Patent Number: 4,621,723
[45] Date of Patent: Nov. 11, 1986

[54] FREEWHEELING ADAPTER

[75] Inventor: Gaynor V. Carlson, Atwood, Kans.

[73] Assignee: Bell and Carlson, Incorporated, Atwood, Kans.

[21] Appl. No.: 673,391

[22] Filed: Nov. 20, 1984

[51] Int. Cl.[4] .................. F16D 1/06; F16D 11/00; B60B 27/02
[52] U.S. Cl. ...................... 192/71; 192/50; 192/93 R; 403/1
[58] Field of Search ............ 192/50, 49, 71, 95, 192/93 R; 403/1

[56] References Cited

U.S. PATENT DOCUMENTS

| | | | |
|---|---|---|---|
| 1,976,068 | 10/1934 | Higbee . | |
| 2,846,039 | 8/1958 | Requa et al. | 192/71 |
| 2,858,163 | 10/1958 | Nagel | 301/1 |
| 2,907,432 | 10/1959 | Strickland et al. | 192/71 |
| 2,970,008 | 1/1961 | Leach | 301/1 |
| 3,656,598 | 4/1972 | Goble | 192/50 X |
| 4,089,610 | 5/1978 | Kleespies et al. | 192/50 X |
| 4,333,688 | 6/1982 | Lemmon et al. | 301/36 |
| 4,337,003 | 6/1982 | Juhl | 192/50 X |

Primary Examiner—Rodney H. Bonck
Attorney, Agent, or Firm—Norvell E. Von Behren

[57] ABSTRACT

A freewheeling adapter for use on a vehicle such as a car or truck which is designed to be mounted on the existing wheel hub of the vehicle is disclosed. The adapter allows the vehicle to be converted to freewheeling thereby permitting the vehicle to easily be towed without damaging the drive train such as the automatic transmission of the vehicle. The adapter as designed eliminates the use of a wrecker truck in towing an automatic transmission vehicle by raising the drive wheels off of the ground during the towing process. The adapter may be designed having a lock-out feature which allows the adapter to be converted from freewheeling to non-freewheeling should it be desired to permanently mount the adapter on a vehicle. When the modification having the lock-out feature is installed on the drive wheels of a car, such as the front wheels of a smaller size front wheel drive vehicle, the vehicle can then be easily towed in a freewheeling mode behind a recreational vehicle such as a motor home and can then be easily converted to a non-freewheeling mode at the user's destination by use of the lock-out feature. The applicants invention may also be used by movers to tow a front wheel drive vehicle behind a moving van while moving the client's goods in the moving truck.

6 Claims, 19 Drawing Figures

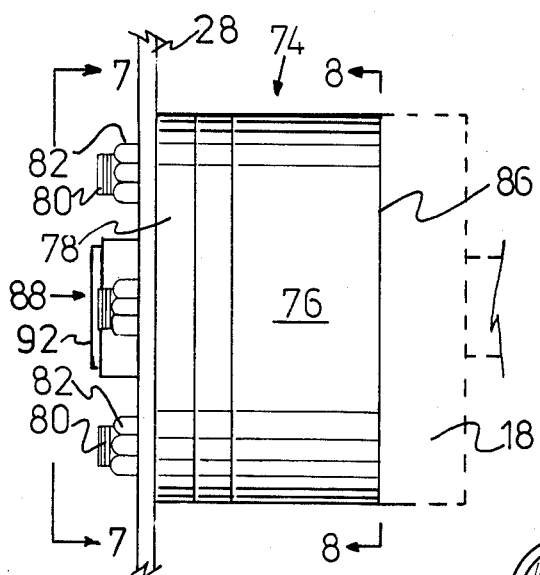
FIG-6
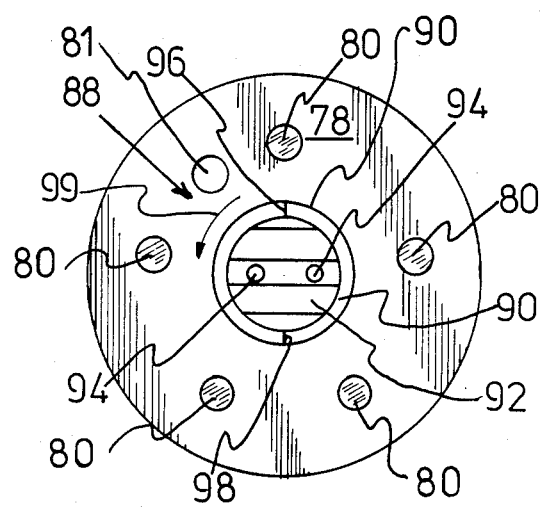
FIG-7
FIG-19
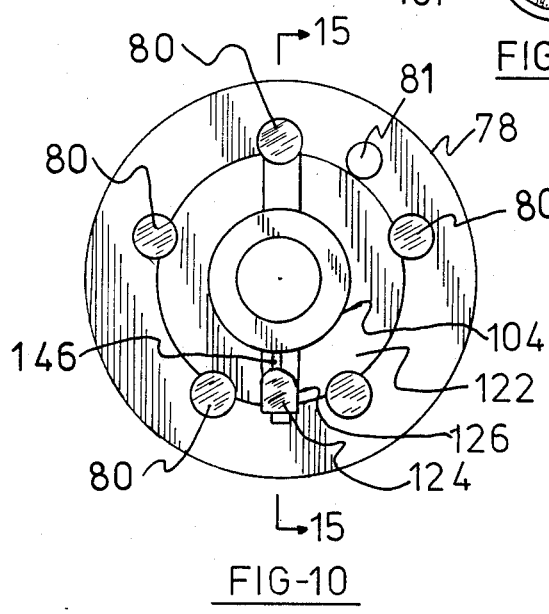
FIG-10
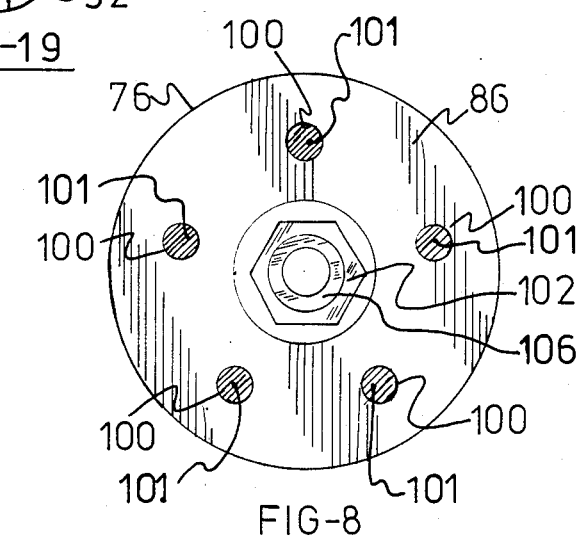
FIG-8
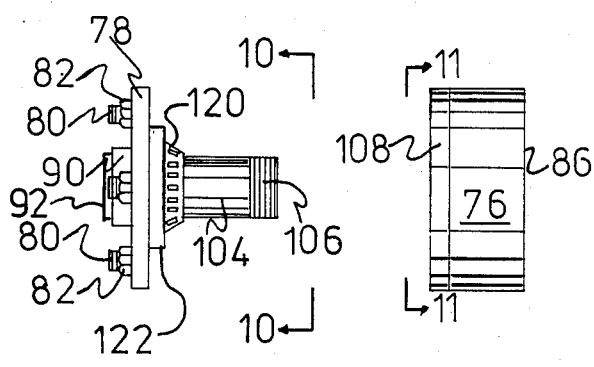
FIG-9
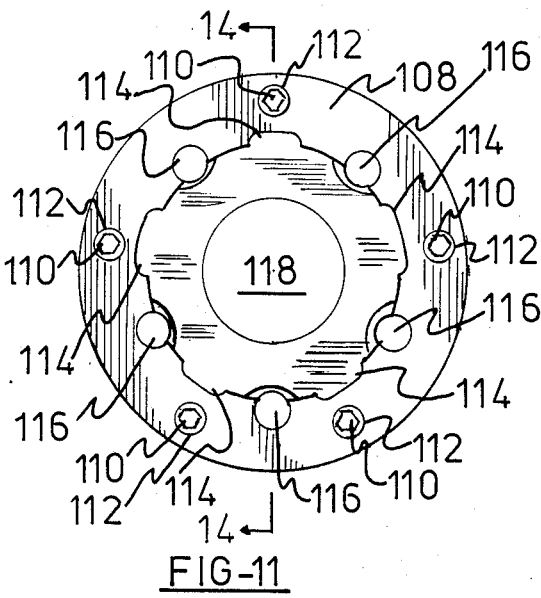
FIG-11

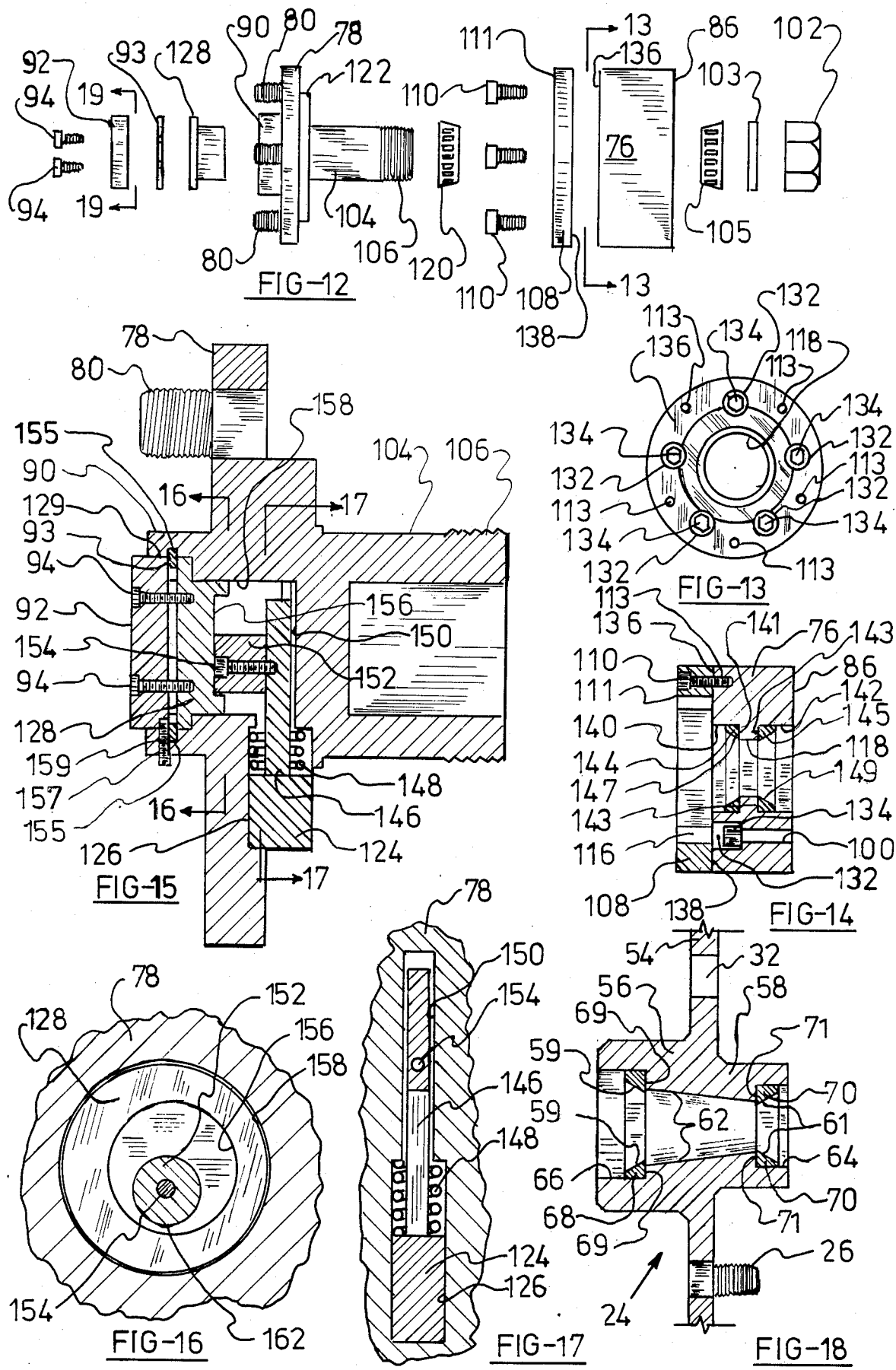

FREEWHEELING ADAPTER

BACKGROUND OF THE INVENTION

This invention relates to an automotive accessory in general and more particularly to a new and novel freewheeling adapter for use on a car or truck to protect the drive train during towing of the vehicle.

Whenever automotive vehicles such as a car or truck having an automatic transmission break down on the road, the vehicle generally must be towed by a wrecker truck which will raise the drive wheels of the vehicle off of the ground in order to prevent damage to the drive train while towing the vehicle to the repair station. While such a method of towing is usually satisfactory in city areas where wrecker trucks are readily available, the towing of a disabled vehicle in rural areas can become a problem due to the unavailability of a wrecker truck. Should the vehicle be towed without raising the drive wheels from the ground, then damage can occur to the automatic transmission of the vehicle.

It is known to provide vehicles with floating wheel hub arrangements as typified by the U.S. Pat. No. 1,976,068, issued Oct. 9, 1934 to J. F. Higbee. Such arangements are built into the rear drive portion of a truck and are designed to eliminate uneven wear on tire treads by mounting the wheel assembly upon its supporting axle to permit limited swinging movement of the assembly in a vertical plane transverse to the plane of the assembly. Such mounting assemblies are used to assure that both single and dual assemblies of the truck will lie in a plane vertical to the sloping surface of the side of the road at all times.

It is also known to provide adapter assemblies to convert vehicle axles from semi-floating to full floating which is useful in increasing load capacity and dependability and simplifying servicing of the vehicle as taught in the U.S. Pat. No. 2,858,163, issued Oct. 28, 1958 to F. E. Nagel. It is also known to provide safety wheel attachments for motor vehicles in order to widen the wheel base of a motor vehicle in order to improve the stability of the vehicle making them easier to control on curves as typified in the U.S. Pat. No. 2,970,008, issued Jan. 31, 1961 to K. J. Leach.

A mounting arrangement for providing dual wheels on a single wheeled vehicle is taught in the U.S. Pat. No. 4,333,688, issued June 8, 1982 to E. M. Lemmon et al. Such dual wheel mounting arrangements are designed for correcting tire life and tire wear thereby allowing cross switching of the wheels easier than has been heretofore possible.

The prior art vehicle adapters, while undoubtedly satisfactory for the specific purpose designed, do not have the novel features which are available with the applicants freewheeling adapter hereinafter to be described.

Another important use of the applicant's novel invention is for use in towing front wheel drive vehicles behind recreation vehicles such as motor homes or the like. Present devices available today may comprise towing frames which will lift the front wheels off of the ground thereby disengaging the front wheel drive vehicle's automatic transmission. Such devices are also often used with moving vans that are utilized to tow a person's car as well as transport his possessions.

SUMMARY OF THE INVENTION

There is provided by the applicants invention a novel freewheeling adapter that may be quickly mounted on a disabled or non-disabled vehicle using the existing wheel hub of the vehicle in order to tow the vehicle without damaging the drive train. The vehicle would have its drive wheels removed with the applicants freewheeling adapters being mounted on the drive wheel hubs. Thereafter the tire and rims of the existing wheels would be replaced onto the freewheeling adapter allowing the entire vehicle to be easily towed by another vehicle such as a wrecker truck, a recreation vehicle or a moving van to name a few vehicles.

The applicants freewheeling adapter thereby converts the drive wheels of the vehicle to freewheeling wheels eliminating the necessity of raising the wheels off of the ground by a wrecker truck or by using the before-described towing frame. The applicants freewheeling adapter may also be constructed with a lockable feature which allows the adapter to be converted from freewheeling to non-freewheeling by a simple change. This would then allow the adapter to be permanently mounted to the drive wheels of an automobile or truck with a modified tire rim. When permanently mounted, then the drive wheels of the automobile or truck could quickly be converted to freewheeling should the vehicle break down in the field and need to be towed by another vehicle or for everyday towing behind a recreation vehicle or moving van.

Accordingly it is an object and advantage of the invention to provide a simplified freewheeling adapter that may be quickly mounted on an existing wheel hub of a vehicle to convert the drive wheel to a freewheeling wheel thereby permitting the vehicle to be easily towed without having to raise the drive wheels off of the ground.

Another object and advantage of the invention is to provide a new and novel freewheeling adapter that may be quickly and easily converted from freewheeling to non freewheeling by a simple change of a mechanical member in the device.

Yet another object and advantage of the invention is to provide a simplified way for a disabled vehicle to be towed without damage to the power train and without requiring the vehicle to have its drive wheels raised off of the ground during the towing process.

Still another object and advantage of the invention is to provide a new and novel device which may be simply added to the drive wheels of an automobile to allow the automobile to be towed behind a recreational vehicle, a moving van or other vehicles with the device being constructed for easy conversion from freewheeling to non-freewheeling.

These and other objects and advantages of the invention will become apparent from a study of the drawings and from a reading of the description of the preferred embodiment which is given hereinafter by way of illustration only.

BRIEF DESCRIPTION OF THE DRAWINGS

FIG. 6 is a side view of a modification of the applicants freewheeling adapter when constructed as a lockable freewheeling adapter for use with recreational vehicles and movng vans.

FIG. 7, is a side view, taken along line 7—7 of FIG. 6.

FIG. 8 is a side view, taken along line 8—8 of FIG. 6.

FIG. 9 is an exploded view of the modified lockable freewheeling adapter shown in FIG. 6.

FIG. 10 is a side view, taken along line 10—10 of FIG. 9 showing the male locking portion of the lockable feature.

FIG. 11 is a side view, taken along line 11—11 of FIG. 9 showing in greater detail the female locking portion of the modified lockable freewheeling adapter.

FIG. 12 is a further exploded view similar to the exploded view of FIG. 9.

FIG. 13 is an end view, taken along line 13—13 of FIG. 12.

FIG. 14 is a cross-sectional view, taken along line 14—14 of FIG. 11.

FIG. 15 is a cross-sectional view, taken along line 15—15 of FIG. 10.

FIG. 16 is a partial cross-sectional view, taken along line 16—16 of FIG. 15.

FIG. 17 is a partial cross-sectional view, taken along line 17—17 of FIG. 15.

FIG. 18 is a cross sectional view, taken along line 18—18 of FIG. 5.

FIG. 19 is a view taken along line 19—19 of FIG. 12.

DESCRIPTION OF THE PREFERRED EMBODIMENT

Figure 1:
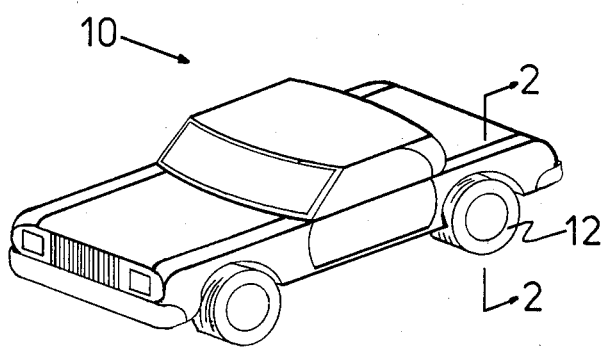
FIG. 1 is a perspective view of a vehicle having the applicants freewheeling adapter installed.

Referring now to FIG. 1 of the drawings there is shown a perspective view of a vehicle such as an automobile or truck having the applicants freewheeling adapter installed. The vehicle, shown generally by 10 would be the type which would have an automatic transmission which would require the vehicle to be towed with the drive wheels lifted off of the road by the towing vehicle in order to avoid damage to the automatic transmission. The adapter could also be installed on the front hubs of a front wheel drive vehicle. The applicants new and novel invention in its preferred embodiment and modified form alleviates this problem and allows the vehicle 10 to be quickly converted to one having freewheeling drive wheels 12. By the conversion of the vehicle 10 in this manner, then the vehicle can be towed easily by another vehicle simply using a chain or tow bar since the drive wheels would have been converted to freewheeling and the drive train would have thereby been disengaged preventing damage to the drive train.

Figure 2:
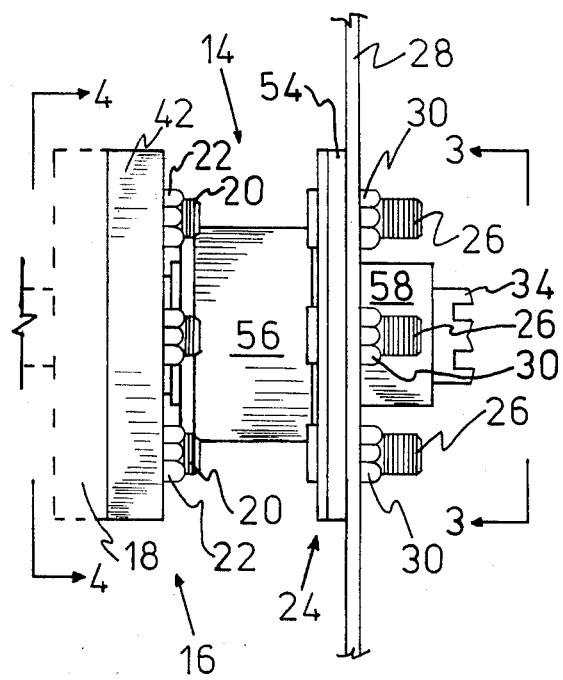
FIG. 2 is a side view, taken along line 2—2 showing the mounting of the applicants freewheeling adapter onto the existing hub of the vehicle of FIG. 1.

Referring now to FIG. 2 of the drawings there is shown a side view, taken along line 2—2 of FIG. 1 showing the mounting of the applicants freewheeling adapter onto the existing hub of the vehicle 10 shown in FIG. 1. The freewheeling adapter shown generally by the numeral 14 would comprise a fixed plate shown generally by the numeral 16 which would be mounted on the existing wheel hub 18 shown dashed in the drawings. The wheel hub would be accessed by removing the existing tire and rim of the rear wheels 12 as shown in FIG. 1 and replacing the fixed plate 16 of the applicants invention onto the existing wheel studs 20 using the wheel nuts 22.

A rotatable plate, shown generally by the numeral 24 is rotatably mounted on the fixed plate 16 and has formed thereon a plurality of mounting studs 26 designed to receive the tire and rim 28 of the wheels 12 which had been previously removed from the vehicle 10. A plurality of nuts 30 are used to tightly position the tire and rim 28 onto the rotatable plate 24. In this manner, the rotatable plate 24 then can rotate about the fixed plate 16 making the rear wheels freewheeling and allowing the vehicle 10 to be easily towed without disengaging the drive shaft or raising the rear wheels of the vehicle off of the road by a dolly, by the use of a wrecker truck or by using a towing frame.

Figure 3:
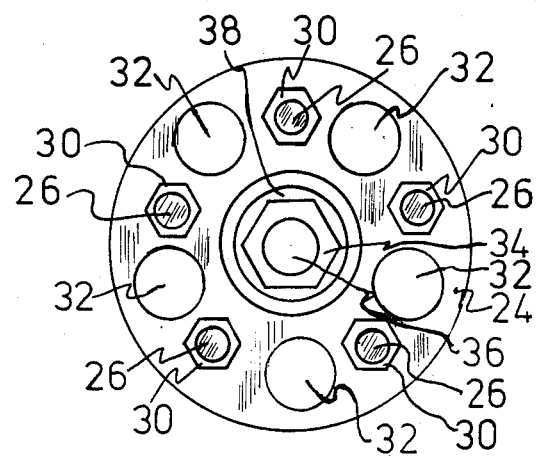
FIG. 3, is an end view, taken along line 3—3 of FIG. 2 showing in greater detail the freewheeling adapter.

Referring now to FIG. 3 of the drawing, there is shown an end view, taken along line 3—3 of FIG. 2 showing in greater detail the applicants novel freewheeling adapter. For purposes of clarity, in FIG. 3, the existing tire and rim 28 of the wheels 12 as shown in FIG. 2 have been eliminated in FIG. 3. There is provided in the rotating plate 24 at least one hole 32 which may be aligned with the existing wheel studs 20 of the existing hub 18 on the vehicle 10. The purpose of the hole 32 would be to allow the applicants device to be easily mounted on the existing studs 20 using a lug wrench which would be positioned through the hole 32 in order to tighten the existing nuts 22 onto the existing studs 20 after the fixed plate 16 has been positioned over the studs. A plurality of holes 32 may also be utilized as shown in FIG. 3 in order to make the mounting easier to accomplish. The hole or holes 32 would be sized large enough for a lug wrench to fit through the holes.

Figure 5:
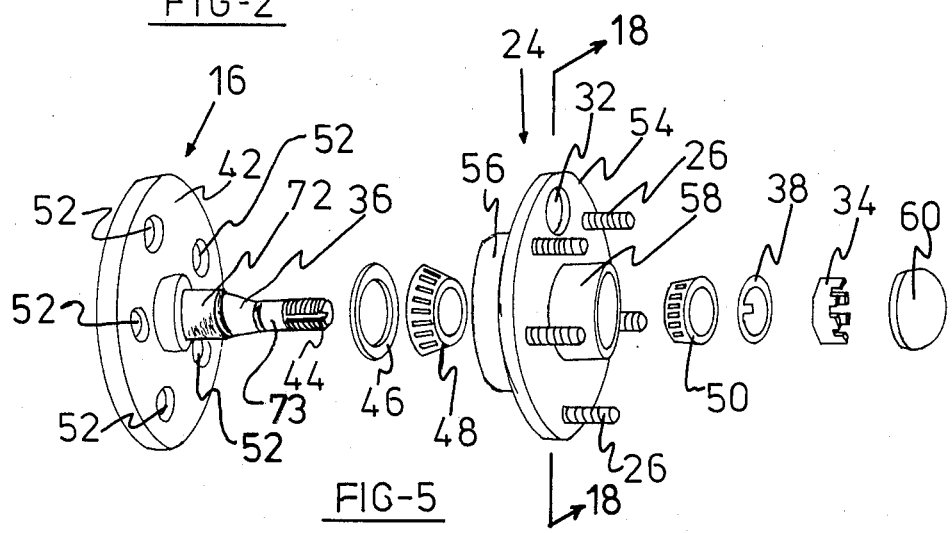
FIG. 5 is an exploded view of the freewheeling adapter shown in FIG. 2.

A nut 34 is tightly positioned on an axle 36 which is formed on the fixed plate 16 as can be more clearly seen in the exploded view of FIG. 5 of the drawings. A washer 38 is positioned beneath the nut 34 and rests against a bearing 50 also seen more clearly in FIG. 5. A cotter pin, not shown in the drawings may be inserted through the thread 44 of the axle 36 in order to secure the nut 34 onto the axle.

Figure 4:
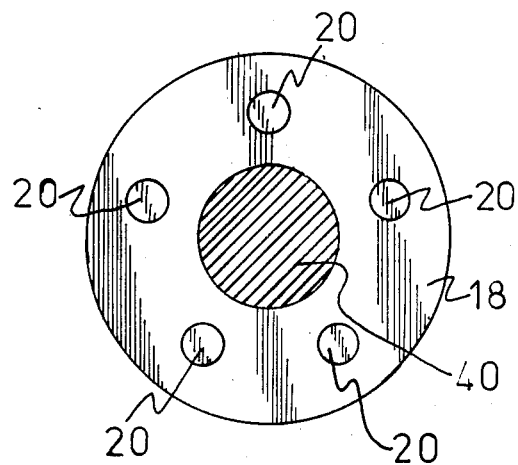
FIG. 4, is an end view, taken along line 4—4 of FIG. 2.

Referring now to FIG. 4 of the drawing, there is shown an end view, taken through the existing wheel hub 18 and showing the drive shaft 40 of the automobile which is to be disconnected or made freewheeling by the applicants novel invention. The existing studs 20 fixedly attached to the hub 18 are used as shown in FIG. 2 to mount the applicants freewheeling adapter and in particular the fixed plate 16 of the freewheeling adapter onto the studs.

Referring now to FIGS. 5 and 18 of the drawing there is shown in FIG. 5 an exploded view of the freewheeling adapter shown in FIG. 2 which is formed with the fixed plate 16 and the rotating plate 24 as has been before mentioned. The fixed plate 16 would comprise a circular plate 42 having formed thereon the axle 36 with a threaded end 44 for receipt of the nut 34 as has been before mentioned. A plurality of holes 52 would be formed in the circular plate 42 and would be designed to receive the existing studs 20 of the existing wheel hub 18 shown in FIG. 2.

The rotatable plate 24 comprises a circular plate 54 having formed therein a cylindrical opening or bore to receive the axle 36 and further has positioned therein a pair of bearings 48 and 50 which allow the rotatable plate 24 to rotate about the axle 36 making the vehicle 10 a freewheeling vehicle.

The circular plate 54 is formed with a cylindrical section 56 on one side thereof and formed with a cylindrical section 58 on the other side thereof designed to receive the bearings 48 and 50 within the member. The internal construction of the rotatable plate is shown more clearly in FIG. 18. It can be seen in FIG. 18 how an internal tapered bore 62 is formed between the cylindrical bores 64 and 66. A bearing cup 68 is positioned in the bore 66 to receive the bearing 48 and rests against the inner surface 69 of the cylinder 56. A bearing cup 70 is positioned in the bore 64 to receive the bearing 50 and rests against the inner surface 71. The bearing 48 then seats on the cylindrical surface 72 of the axle 36 and on the tapered surface 59 bearing cup 68 while the bearing 50 seats on the cylindrical surface 73 of the axle 36 and on the tapered surface 61 bearing cup 70. For purposes of clarity, the bearing cups 68 and 70 are not shown in the FIG. 5 exploded view but are shown in the cross-sectional view of FIG. 18 positioned within the circular plate 54.

A seal 46 would be positioned on the axle 36 over the surface 72. A washer 38 would be positioned on the axle 36 over the surface 73 and a nut 34 would be screwed onto the threaded portion 44 of the axle 36. A grease cap 60 would then be positioned over the nut 34 to retain grease packed in the bearings within the rotating member 24.

From the foregoing it can be seen that the applicant's novel device provides a freewheeling adapter which may be quickly mounted to the existing hub 18 of the vehicle 10 thereby making the drive wheels of the vehicle freewheeling. The mounting of the applicants novel freewheeling adapter 14 to the drive wheels of a vehicle in effect disengages the drive train allowing the vehicle to be quickly and easily towed by another vehicle without the raising of the drive wheels. In using the applicant's device in the method of the invention, the person desiring to tow a vehicle having an automatic transmission would provide at least one pair of the freewheeling adapters which would have the means contained on the adapters to mount the adapters to the vehicle wheel hubs of each drive wheel. The person would then remove the tire and rim of the drive wheels and would mount the freewheeling adapter onto the vehicle wheel hub. Thereafter he would remount the tire and rims from the drive wheels onto the freewheeling adapters to thereby convert the drive wheels to freewheeling wheels and to permit the vehicle to be towed without the use of a wrecker truck.

Referring now to FIG. 6 of the drawing there is shown a modification of the applicants novel invention wherein his freewheeling adapter is formed as a lockable freewheeling adapter, shown generally by the numeral 74 which would comprise a fixed member 76 and a rotatable member 78 which would rotate about the fixed member 76. The fixed member 76 would be mounted on the existing hub 18 of the vehicle 10 after removing the wheels 12 of the drive portion of the automobile. The wheels 12 would then be remounted with the rim portion 28 of the wheels being mounted onto the rotatable member 78 by means of the studs 80 and the plurality of nuts 82.

It can be then seen in FIG. 6 how the rear surface 86 would be positioned against the existing hub 18 of the vehicle with the existing hub being shown in dashed lines for purposes of clarity. There is contained on the rotatable member 78 a moving means 88 for moving the male locking portion of the device which will be described more fully hereinafter from a locked position to an unlocked position thereby converting the adapter from a non-freewheeling condition to a freewheeling condition.

Referring now to FIG. 7 of the drawings, there is shown a side view, taken along line 7—7 of FIG. 6 showing in more detail the moving means 88 which would be positioned within the cylindrical member 90 formed on the rotatable member 78. A round plate 92 would be positioned within the cylindrical member 90 and would be held to the part beneath the round plate by means of bolts 94 which will be described more fully hereinafter. A lock indicator 96 would be scribed on the cylindrical member 90 and an unlocked indicator 98 would also be scribed on the member to indicate the position of the device either in the locked or unlocked condition. The round plate 92 would then rotate in the direction shown by the arrow 99 from the locked to the unlocked position as desired by the user of the device and back again as desired.

A plurality of studs 80 as has been before mentioned would be fixedly attached to the rotatable member 78 for the purpose of locking the rim 28 of the wheels 12 onto the device. For purposes of clarity, in FIG. 7, the rim 28 of the wheels 12 as well as the nuts 82 have not been shown.

Referring now to FIG. 8 of the drawing, there is shown a side view, taken along line 8—8 of FIG. 6 showing in more detail the rear surface 86 of the fixed member 76. A plurality of holes 100 are positioned on the rear surface 86 and are designed to receive the existing studs 101 positioned in the existing hub 18 of the vehicle 10. A nut 102 is used to lock the rotatable member 78 to the fixed member 76 as will be described more fully hereinafter.

Referring now to FIG. 9 of the drawing, there is shown a partial exploded view of the modified lockable freewheeling adapter shown in FIG. 6. In FIG. 9 the rotatable member 78 is shown exploded from the fixed member 76 with the rotatable member 78 containing an axle 104 having a threaded portion 106 contained on the end thereof and designed to receive the nut 102 hereinbefore described and shown in FIG. 8. A bearing 120 is positioned on the axle 104 and is used in combination with another bearing to be described hereinafter to allow the rotatable member 78 to rotate on the fixed member 76.

The fixed member 76 is formed in two pieces which are fixedly attached together by a plurality of bolts. One of the two pieces of the fixed member 76 is the circular plate 108 which contains the female locking member used in the applicants device.

Referring now to FIG. 11 of the drawing there is shown a side view, taken along line 11—11 of FIG. 9 showing in greater detail the female locking portion of the modified lockable freewheeling adapter. It can be seen in FIG. 11 how the separate circular plate 108 is bolted to the fixed member 76 by a plurality of bolts 110 which are positioned in the holes 112 and into drilled and tapped holes 113 formed in the fixed member 76 but not shown in FIG. 11 of the drawing. The female locking members 114 used with the lockable portion of the applicants device are formed around the central bore 118 as shown in FIG. 11. A plurality of holes 116 are also formed between the female locking members 114 and are positioned above a plurality of nuts which are contained internally in the fixed member 76 as will be hereinafter described and are designed to lock the fixed member 76 onto the existing studs formed in the existing wheel hub 18.

Referring now to FIG. 12 of the drawing there is shown another exploded view, similar to the view shown in FIG. 9 showing in greater detail more of the parts of the applicant's lockable modification. As has been before mentioned a bearing 120 is positioned over the axle 104 and rests against the raised surface 122 containing the male locking member which is movably mounted in the rotatable member 78 for engagement with the female locking members 114 attached to the fixed member 76. The male locking member is more clearly shown in FIGS. 10 and 15-17 of the drawings and will be described in detail more fully hereinafter. It can be seen in FIG. 12 how the fixed member 76 along with its attached separate circular plate 108 would be bolted together by the plurality of bolts 110.

It can also be seen in FIG. 12 how the axle 104 would be positioned within the bearing 120 and through the separate circular plate 108 along with the fixed member 76 and through the bearing 105 and the washer 103 to be contained by the nut 102.

Referring now to FIGS. 13 and 14 there will be described in more detail how the fixed member 76 with its attached separate circular plate 108 is held onto the existing studs of an automobile wheel hub 18. FIG. 13 is a front view, taken along line 13—13 of FIG. 12 and shows the facing surface 136 of the fixed member 76 which would be engaged with the facing surface 138 of the separate circular plate 108. The rear surface 86 of the fixed member 76 would be positioned against the existing wheel hub 18 of the vehicle to be towed as shown in FIG. 6 of the drawings.

The fixed member 76 contains a plurality of holes 132 which contain a plurality of nuts 134 in juxtaposition to a plurality of aligned holes 100 which are designed to receive the existing studs from the existing wheel hub 18. This can be seen more clearly in FIG. 14 of the drawing where there is shown one of the internally contained nuts 134 positioned within the hole 132 and in alignment with the hole 100. It can also be seen in FIG. 14 that whenever the separate circular plate 108 is positioned onto the fixed member 76 and held thereto by the plurality of bolts 110 which are radially spaced around the facing surface 111 of the separate circular plate 108, the nuts 134 will be held in the holes 132 and cannot drop out. In this manner, the fixed member 76 with its attached separate circular plate 108 may be permanently mounted to an automobile or truck using the self-contained, internally positioned nuts 134 tightly holding the unit onto the existing studs from the existing wheel hub 18. A central bore 118 and two cylindrical bores 140 and 142 allow the axle 104 to pass through the separate circular plate 108 as well as the fixed member 76.

A pair of bearing cups 144 and 145 are seated in the cylindrical bores 140 and 142 and against the abutting surfaces 141 and 143 to receive the bearings 120 and 105 which ride against the tapered surfaces 147 and 149 of the bearing cups.

Referring now to FIGS. 10 and 15-17 of the drawing there will be described in more detail the male locking member 124 of the applicants invention which is designed to mate with the female locking members 114 on the separate circular plate 108 whenever the rotatable member 78 is positioned within the fixed member 76. In FIG. 10 it can be seen how the male locking member 124 is positioned as shown within the raised surface 122 and is designed to move in and out sufficiently so as to engage with one of the female locking members 114. A hole 81 may also be positioned in the rotatable member 78 and in juxtaposition to the holes 116 and 132 to provide access to the nuts 134 for locking the nuts with an allen wrench. The bearing 120 is not shown in FIG. 10 for clarity.

The male locking member 124 slides in a recess 126 as can also be seen in FIGS. 15 and 17 of the drawings. Referring now to FIG. 15 of the drawing there is shown a cross-sectional view, taken along line 15—15 of FIG. 10 showing in more detail how the male locking member 124 is activated. A rod 146 is fixedly attached to the male locking member 124 and is spring biased by means of the spring 148 to yieldably urge the male locking member 124 outwardly in order to prevent an accidental disengagement thereof. The rod 146 is fixedly attached to a cam follower 152 by means of a bolt 154 contained within a drilled and tapped hole in the cam follower 152 and the rod 146. The rod 146 rides within a machine groove 150 as can be seen in FIG. 15 as well as in FIG. 17 of the drawings.

By referring to FIG. 16 of the drawing there can be seen a cross-sectional view, taken along line 16—16 of FIG. 15 showing how the cam member 128 is positioned within the bore 129 and held therein by means of an expanded ring 93 of the type known in the art. For purposes of clarity, the expanded ring 93 is shown in the exploded view of FIG. 12 and in FIG. 15, but is not shown in the cross-sectional view of FIG. 16. The expanded ring 93 sits in a groove 155 and retains the cam member 128 within the bore 129 and prevents it from being disengaged from the bore.

The cam member 128 is formed with a circular recess 156 positioned eccentrically from the recess 158 to allow the cam follower 152 to ride in the eccentrically positioned recess. By turning the round plate 92 from a locked to an unlocked position, the outer surface 162 of the cam follower 152 will be moved causing the male locking member 124 to move from a locked to an unlocked position and vice versa depending upon the rotational position of the round member 92. A drilled and tapped hole 157 contains an internally positioned screw 159 which engages a semi-circular groove 161 formed on the bottom surface 164 of the round plate 92 to limit rotational movement of the round member 92 to an arc of 180°. For purposes of clarity the circular groove 161 is not shown in the drawing FIG. 15 but is shown in the drawing FIG. 19. When formed thusly it can be seen that the male locking member 124 would engage with one of the female locking members 114 on the separate circular plate 108 whenever the unit was assembled as shown in FIG. 6 of the drawing. It can also be seen how the fixed member 76, when permanently attached to the existing hub 18 of an automobile, would allow the user of the device to convert his drive wheels to a modifiable freewheeling or non-freewheeling condition simply by rotation of the round plate 92 to engage the male locking member 124 with the female locking member 114. When formed in this manner, then the purchaser of the device can permanently mount the device on his automobile and should he need to tow the automobile would simply unlock the adapter to a freewheeling position to, in effect, disengage his automatic transmission or drive train from the wheels.

When converting a vehicle having an automatic transmission to one that can be safely towed without damaging the automatic transmission and without the use of a special frame, the purchaser of the device would provide at least one pair of lockable freewheeling adapters having the means contained thereon to mount the adapters to the existing drive wheel hubs of the vehicle and he would remove the existing tires and rims from the drive wheels and would mount the adapters on the existing drive wheel hubs. Then he would remount the existing tires and rims on to the adapters and would select the desired condition of the adapter using the round plate 92 and would turn the round plate 92 in the direction shown by the arrow 99 to either lock or unlock the adapter from either a non-freewheeling conditin to a freewheeling condition.

From the foregoing it can be seen that there has been provided by the subject invention a novel freewheeling adapter for use on a vehicle which allows the vehicle to be converted to freewheeling thereby permitting the vehicle to be easily towed without damaging the drive train. The applicants invention in its two forms shown in the drawings and described in the preferred embodiment may be made as shown and may also be made in other constructions within the spirit and scope of the invention. Modifications may be made in the parts, the arrangement of the parts and in the steps of the method without departing from the spirit and scope of the invention and the applicant is not to be limited to the exact embodiments shown which have been given by way of illustration only.

Having described by invention, I claim:

1. A lockable freewheeling adapter for use on a vehicle having tires, rims and vehicle studs and designed to be mounted on an existing wheel hub of the vehicle to convert the wheel to freewheeling or non-freewheeling as desired thereby permitting the vehicle to be quickly converted to freewheeling so that it can be towed, comprising:
   (a) a fixed member having a plurality of holes and wheel nuts positioned within the member and in juxtaposition to the holes for mounting the fixed member to the existing wheel hub using the existing vehicle studs, the fixed member being formed with a central opening for receipt of an axle;
   (b) at least one female locking member fixedly attached to the fixed member;
   (c) a rotatable member, rotatably mounted on the fixed member and having formed thereon a plurality of mounting studs for mounting the tire and rim of the vehicle on the mounting studs, the rotatable member comprising a circular plate having said axle fixedly attached thereto;
   (d) a plurality of nuts, positioned on the rotatable member studs for tightly holding the tire and rim of the vehicle to the rotatable member;
   (e) at least one male locking member, moveably mounted in the rotatable member for engagement with the female locking member attached to the fixed member; and
   (f) means, associated with the rotatable member and male locking member, for moving the male locking member from a locked position to an unlocked position thereby converting the adapter from a non-freewheeling condition to a freewheeling condition.

2. The lockable freewheeling adapter as defined in claim 1 wherein the fixed member is formed in two pieces fixedly attached together by a plurality of bolts and the female locking member is formed on one of the two pieces.

3. The lockable freewheeling adapter as defined in claim 2, wherein the female locking member comprises a recess formed on one of the two pieces.

4. The lockable freewheeling adapter as defined in claim 3, wherein there are formed multiple recesses formed on one of the two pieces.

5. The lockable freewheeling adapter as defined in claim 1, wherein a pair of bearings are positioned around the axle and the axle has formed thereon a thread, the axle being held onto the fixed member by a nut positioned over the thread.

6. The lockable freewheeling adapter as defined in claim 1 further comprising:
   (g) access means, associated with the rotatable member for providing easy access by a wrench for mounting the adapter to the existing wheel hub.

* * * * *